(12) United States Patent
Ponthieu et al.

(10) Patent No.: US 12,319,129 B2
(45) Date of Patent: Jun. 3, 2025

(54) VEHICLE TRIM COMPONENT COMPRISING A FUNCTIONAL ELEMENT AND AN AERATOR

(71) Applicant: FAURECIA INTERIEUR INDUSTRIE, Nanterre (FR)

(72) Inventors: Didier Ponthieu, La Neuville Saint Pierre (FR); Olivier LeBorgne, Saint Paul (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 402 days.

(21) Appl. No.: 17/788,695

(22) PCT Filed: Dec. 22, 2020

(86) PCT No.: PCT/EP2020/087693
§ 371 (c)(1),
(2) Date: Jun. 23, 2022

(87) PCT Pub. No.: WO2021/130263
PCT Pub. Date: Jul. 1, 2021

(65) Prior Publication Data
US 2023/0034123 A1    Feb. 2, 2023

(30) Foreign Application Priority Data

Dec. 23, 2019   (FR) ...................... 1915408

(51) Int. Cl.
*B60H 1/34* (2006.01)
*B60H 1/24* (2006.01)
(Continued)

(52) U.S. Cl.
CPC .......... *B60H 1/3414* (2013.01); *B60H 1/241* (2013.01); *B60K 35/00* (2013.01); *B60K 35/60* (2024.01);
(Continued)

(58) Field of Classification Search
CPC .................. B60H 1/3414; B60H 1/241; B60H 2001/3478; B60K 35/60; B60K 35/00; B60K 2360/658
(Continued)

(56) References Cited

U.S. PATENT DOCUMENTS 9,163,848 B2 * 10/2015 Doll ..................... B60H 1/3414
9,513,027 B2 * 12/2016 Londiche ............. C21D 9/0087
(Continued)

FOREIGN PATENT DOCUMENTS

DE    112014001828 T5    12/2015
DE    102015120290 A1 *  6/2016  ........... B60H 1/3421
(Continued)

OTHER PUBLICATIONS

French Search Report corresponding to French Application No. FR 1915408, dated Sep. 11, 2020, 2 pages.
(Continued)

*Primary Examiner* — Avinash A Savani
*Assistant Examiner* — Dana K Tighe
(74) *Attorney, Agent, or Firm* — Reising Ethington P.C.

(57) ABSTRACT

A vehicle trim element having at least one functional component and at least one aerator of the vehicle compartment. The aerator includes at least one duct for conveying a gas flow defining an opening for diffusing the gas flow, the conveying duct extending in a main direction. The aerator is arranged to diffuse a gas flow in the passenger compartment of the vehicle in a diffusion direction in which the gas flow is diffused and which is variable by Coanda effect, between a first diffusion direction and a second diffusion direction that is different from the first diffusion direction. The opening for diffusing the gas flow extends around the periphery of at least one portion of the functional component.

15 Claims, 8 Drawing Sheets

(51) Int. Cl.
*B60K 35/00* (2006.01)
*B60K 35/60* (2024.01)

(52) U.S. Cl.
CPC .......................... *B60H 2001/3478* (2013.01);
*B60K 2360/658* (2024.01)

(58) Field of Classification Search
USPC .......................................................... 454/155
See application file for complete search history.

(56) References Cited

U.S. PATENT DOCUMENTS

| | | | | |
|---|---|---|---|---|
| 10,343,493 | B2 * | 7/2019 | Terasawa ................ | B60H 1/345 |
| 10,675,947 | B2 * | 6/2020 | Motomura .............. | B60H 1/242 |
| 2015/0375601 | A1 * | 12/2015 | Jeon ...................... | B60H 1/3421 |
| | | | | 454/155 |
| 2016/0361977 | A1 | 12/2016 | Freese et al. | |
| 2019/0039389 | A1 | 2/2019 | Ohnishi | |
| 2021/0094381 | A1 * | 4/2021 | Dutot ................... | B60H 1/0065 |
| 2022/0032731 | A1 * | 2/2022 | Skapof ............... | B60H 1/00871 |

FOREIGN PATENT DOCUMENTS

| | | |
|---|---|---|
| DE | 102015109069 A1 | 12/2016 |
| WO | 2016158101 A1 | 10/2016 |
| WO | 2017199655 A1 | 11/2017 |
| WO | 2019120891 A1 | 6/2019 |

OTHER PUBLICATIONS

International Search Report translation into English for PCT/EP2020/087693, Feb. 18, 2021, 2 pages.
Written Opinion translation into English for PCT/EP2020/087693, Feb. 18, 2021, 7 pages.

* cited by examiner

VEHICLE TRIM COMPONENT COMPRISING A FUNCTIONAL ELEMENT AND AN AERATOR

TECHNICAL FIELD

The present invention relates to a vehicle trim element, of the type comprising at least one functional component and at least one aerator for aerating the passenger compartment of the vehicle, the at least one aerator comprising at least one gas flow conveying duct for conveying a gas flow defining a gas flow diffusion opening, the at least one gas flow conveying duct extending in a main direction, the at least one aerator being arranged to diffuse a gas flow in the passenger compartment of the vehicle in a gas flow diffusion direction that is variable, by Coanda effect, between a first diffusion direction and a second diffusion direction, different from the first diffusion direction.

The trim element is adapted to trim or form a dashboard body, a center console, a door panel, an armrest or such like, for example.

BACKGROUND

Such a trim element may comprise many functional components. The functional component is a storage space or a display device, for example. The display devices on such trim elements are used to display vehicle driving information, geolocation data, and audiovisual content information, for example. The current trend for these displays is for them to be placed typically on the dashboard or center console, and to be increasingly larger in size to improve readability and/or display multiple types of content simultaneously. Similarly, storage spaces tend increasingly to be large, to increase the available storage volume and improve ergonomics within the compartment.

Typically, one or more aeration device outlets also emerge from the surface of the trim element. These outlets take up a certain amount of space to provide increased gas flow directionality. The space requirement generated on the trim element may thus be incompatible with increasing the size of the functional component.

SUMMARY

An object of the invention is to overcome this disadvantage by proposing a trim element that makes it possible to integrate a functional component of large size while maintaining one or more outlets of an aeration device.

To this end, the invention relates to a trim element in which the opening for diffusing the gas flow extends around the periphery of at least a portion of the at least one functional component.

Thus, the trim element comprises an aerator whose outlets that open onto the trim element are minimized in size, making it possible to obtain effective aeration, and whose directivity can be controlled by Coanda effect, without limiting the size of a functional component present on said trim element. A passenger's comfort is improved considerably in that his or her reading of a display device is enhanced, for example, and the air conditioning in the passenger compartment remains effective and can be manipulated as desired.

According to other features of the invention, taken alone or in any technically conceivable combination:

an angle between the first diffusion direction and the second diffusion direction is between 20° and 60°;

the at least one gas flow conveying duct comprises at least a first gas flow conveying subduct and a second gas flow conveying subduct, in fluid communication with the gas flow diffusion opening, the at least one first and the at least one second subduct being separated by a separation wall, the at least one second subduct comprising an aeration flap, movable between a closed position in which the aeration flap closes fluid communication between a vehicle ventilation system and the gas flow diffusion opening, via the at least one second sub-duct and in which the gas flow diffusion direction is the first diffusion direction and an open position in which the aeration flap allows fluid communication between the vehicle ventilation system and the gas flow diffusion opening, via the at least one second sub-duct and in which the gas flow diffusion direction is the second diffusion direction;

the at least one aerator comprises at least one curved surface extending from the gas flow diffusion opening in line with the at least one second gas flow conveying subduct;

the point of maximum curvature of the at least one curved surface has a radius of curvature greater than 10 mm;

the distance in the main direction between the downstream end of the separation wall that separates the gas flow conveying subducts and the point of the at least one curved surface having the maximum curvature, is between 3 mm and 7 mm, preferably between 5 mm and 6 mm;

the at least one second subduct has a decreasing width in the main direction;

the aeration flap is mounted rotatably about a flap rotation axis, between the closed position and the open position, the trim element comprising a control element for controlling the rotation of the aeration flap, the control element comprising a control part rotatably mounted about a control rotation axis and a universal joint configured to drive the flap rotationally about the flap rotation axis when the control part is rotated about the axis of control rotation axis;

the at least one aerator comprises blades, each blade comprising an upstream blade portion and a downstream blade portion, the upstream blade portion extending across the at least one first subduct toward the opening, the downstream blade portion extending from a downstream end of the upstream blade portion across the at least one first subduct into the opening, the downstream blade portion being adapted to change the gas flow orientation relative to the flow direction generated by the upstream blade portion;

the at least one gas flow conveying duct comprises an upstream portion extending in the main direction and a downstream portion extending in a secondary direction, forming a non-zero angle with the main direction, the downstream portion extending downstream of the upstream portion in the gas flow circulation direction in the at least one duct;

the separation wall comprises an upstream portion extending in the main direction and a downstream portion extending in the secondary direction; and the angle formed by the main direction and the secondary direction is substantially between 15° and 25°;

each blade comprises a blade joint, the downstream blade portion being mounted rotatably on the downstream end of the upstream blade portion via the blade joint about a blade rotation axis substantially perpendicular to the secondary direction; and the trim element comprises at least two aerators, each aerator comprising at least one duct defining an opening, the openings being distributed along a same edge of the functional component.

BRIEF DESCRIPTION OF THE DRAWINGS

Further aspects and advantages of the invention will become apparent from the following description, given by way of example and made with reference to the appended drawings, in which.

DETAILED DESCRIPTION

In the following, the terms "upstream" and "downstream" are defined with respect to the flow direction of a gas flow. The direction of elevation is defined according to the height of a vehicle. This direction of elevation is vertical when the vehicle is on level ground, for example. The terms "high", "low", "left" and "right" are defined for a normal vehicle operating situation.

Figure 1:
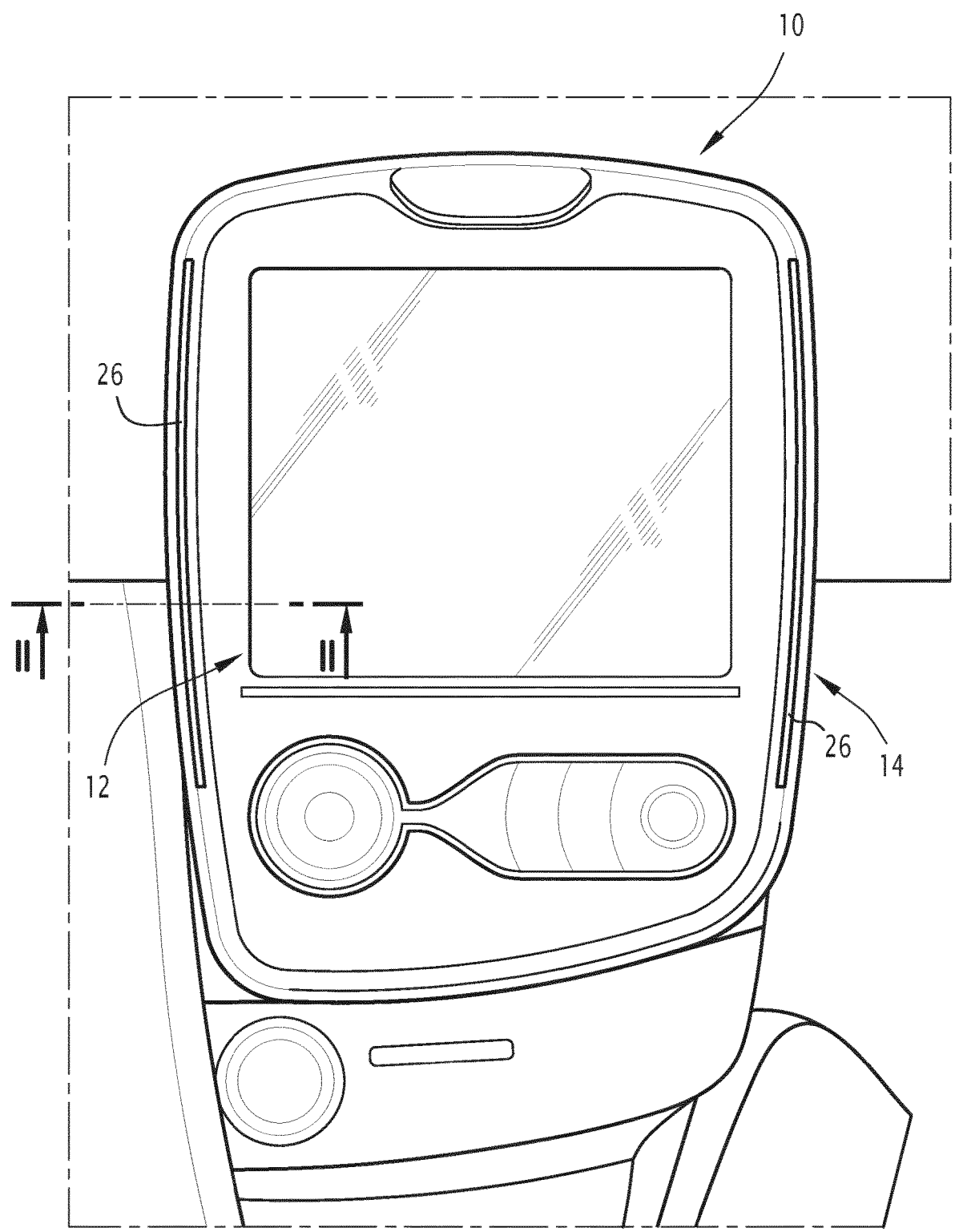
FIG. 1 is a schematic representation of the trim element according to an embodiment of the invention, viewed from the front.

With reference to FIG. 1, a trim element 10 comprising at least one functional component 12 and at least one aerator 14 is described.

The trim element 10 is adapted to trim or form a dashboard body, a center console, a door panel, an armrest, a seat, a pillar or such like, for example.

The trim element 10 comprises a structure supporting the functional component 12 and the aerator 14. The functional component 12 is an attachment to the structure of the trim element 10, for example, set or assembled on the structure, for example. In the case of an instrument panel, the structure of the trim element 10 is formed by the instrument panel body, for example. The functional component 12 is a display, a human/machine interface or a storage space, for example. The functional component 12 is a display device, for example, as shown in FIG. 1, suitable for displaying vehicle driving information, vehicle geolocation data, information on audiovisual content. The human/machine interface is a touch screen, for example. In a variant, the functional component 12 is a decorative part, for example, such as a rigid decorative insert that has a different appearance from the structure of the trim element 10.

With reference to FIGS. 2 through 4 and 7, the aerator 14 comprises at least one duct 20 for conveying a gas flow and a curved surface 22.

The duct 20 comprises an upstream portion 30 and a downstream portion 32 and defines a gas flow diffusion opening 26 at its downstream end, visible in FIGS. 1 to 4.

The duct 20 also comprises at least a first subduct 36 for conveying the gas flow and at least a second subduct 38 for conveying the gas flow.

The upstream portion 30 of the duct 20 extends in a main direction D and is intended to be connected to the vehicle ventilation system.

The downstream portion 32 of the duct 20 extends in a secondary direction D'.

The vehicle ventilation system is configured to circulate a gas flow such as air through the duct 20 from the upstream portion 30 to the opening 26 through the downstream portion 32.

According to the embodiments shown in FIGS. 2 through 4 and 7, the secondary direction D' forms a non-zero angle β with the primary direction D, with the angle β being between 15° and 25°.

The non-zero angle β thus formed by the upstream portion 30 and the downstream portion 32 of the duct 20 allows for a gain in space at the rear of the functional component 12.

According to another embodiment, the main direction D and the secondary direction D' form an angle β of zero between them. Thus, the upstream portion 30 and the downstream portion 32 of the duct 20 extend in the same direction.

The first subduct 36 and the second subduct 38 are in fluid communication with the gas flow diffusion opening 26.

The first subduct 36 and the second subduct 38 are separated by a separation wall 40.

The separation wall 40 comprises an upstream portion 42 that extends in the direction D and a downstream portion 44 that extends in the direction D' over a distance I. The distance I, which is actually the length of the downstream portion 44 in the direction D', is greater than 12 mm.

The second subduct 38 comprises a aeration flap 50, visible in FIGS. 2 through 5 and 7.

The aeration flap 50 is rotatably mounted about a flap rotation axis A-A', for example, at the upstream end of the separation wall 40 between a closed position in which the aeration flap 50 closes fluid communication between the vehicle ventilation system and the gas flow diffusion opening 26 via the second sub-duct 38 and an open position in which the aeration flap 50 allows fluid communication between the vehicle ventilation system and the gas flow diffusion opening 26 via the second sub-duct 38.

In the open position, the aeration flap 50 extends in the main direction D such that the aeration flap 50 does not interfere with the gas flow circulation in the first subduct 36 or the second subduct 38. Thus, it is unnecessary to provide a housing to store the aeration flap in the open position for it not to constitute an obstacle to the gas flow circulation. The aeration flap 50 is connected to an element 54 for controlling the rotation of the aeration flap 50 that controls the passage of the aeration flap 50, from the closed position to the open position, manually or automatically, for example.

The control element forms part of the trim element 10, for example.

Figure 5:
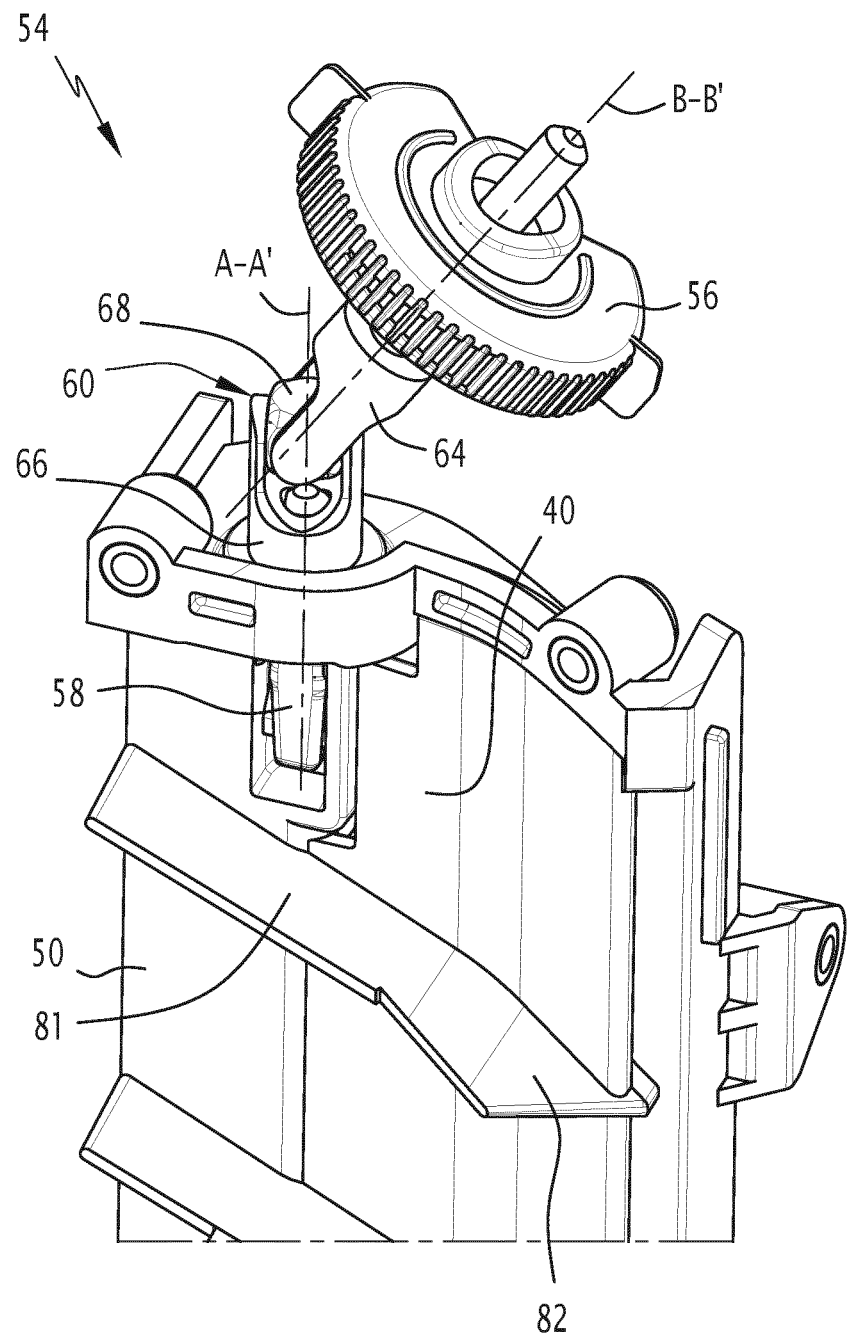
FIG. 5 is a perspective representation of a portion of an aerator comprising an aeration flap and control element for controlling the aeration flap.

With reference to FIG. 5, the control element 54 comprises a control part 56, a drive part 58 for driving the flap 50 and a flap articulation 60 between the control part 56 and the drive part 58.

The control part 56 is a part intended to be manipulated by a user to control the rotation of the flap 50 between the closed position and the open position. It is accessible on an outer surface of the trim element 10, for example. The control part 56 is rotatably mounted about a control rotation axis B-B', for example. The control part 56 is a knob, for example. As illustrated in FIG. 5, the control rotation axis B-B' forms a non-zero angle with the flap rotation axis A-A', for example.

The drive part 58 of the flap 50 is mounted so as to rotate about the flap rotation axis A-A'. The part 58 attaches the control part 56 and the articulation 60 to the flap 50. It drives the flap 50 in rotation about the axis A-A' when the control part 56 is moved in rotation about the axis B-B'. The part 58 is a clamp, for example, integral with the articulation 60 and the flap 50.

The articulation 60 mechanically connects the control part 56 and the drive part 58. The articulation 60 makes it possible to transform of an angular rotation between the control part 56 around the axis B-B' into a rotation of the flap 50 around the axis A-A', for example.

The articulation 60 comprises a control shaft 64, a drive shaft 66 and a universal joint 68 connecting the control shaft 64 and the drive shaft 66, for example.

The drive shaft 64 is fixed rotationally to the drive member 54. The drive shaft 66 is rotationally fixed to the part 58 and thus to the flap 50. The universal joint 68 is configured to drive the flap 50 in rotation about the flap rotation axis A-A' when the control part 56 is moved in rotation about the axis of rotation of the control B-B'.

When the control part 56 is rotated about the B-B' axis, it drives the control shaft 64 in rotation about the same B-B' axis. As the drive shaft 64 is rotated about the B-B' axis, the universal joint 68 drives the drive shaft 66 in rotation about the A-A' axis. As the drive shaft 66 is rotated about the A-A' axis, it drives the drive member 58 and thus the flap 50 in rotation about the same A-A' axis.

The second subduct 38 has a width decreasing from upstream to downstream, the width being defined as the maximum distance between a point on the separation wall and another point on the wall defining the second subduct 38, each point belonging to the same transverse cross section of the second subduct 38, orthogonal to D or D'.

According to one embodiment of the invention, upstream of the upstream portion 30 of the duct 20, paddles (not shown) redirect the gas flow over the entire cross-section of the upstream portion 30 of the duct 20, so that the gas flow is evenly distributed over the entire cross-section of the upstream portion 30 of the duct 20.

The diffusion opening 26 visible in FIGS. 1 through 4 and 7, extends around the periphery of at least a portion of the functional component 12. The opening 26 is adjacent to the functional component 12. For example, the opening 26 extends along a portion of an edge of the functional component 12 in a direction of extension of the opening 26 corresponding to its largest dimension.

According to one example, the trim element 10 comprises at least two aerators 14. Each aerator 14 comprises at least one duct 20 defining an opening 26.

A plurality of openings 26 may be evenly distributed around the functional component 12.

The openings 26 extend, for example, substantially in the direction of elevation or in a direction substantially perpendicular to the direction of elevation.

For example, the openings 26 may be distributed along two opposite edges of the functional component 12. Thus, the openings 26 are arranged along a first edge to diffuse a gas flow toward the driver, for example, and along a second edge opposite the first edge to diffuse a gas flow toward the passenger.

For example, a first opening 26 extends along a first edge of the functional component 12 and a second opening 26 extends along a second edge opposite the first edge.

Figure 6:
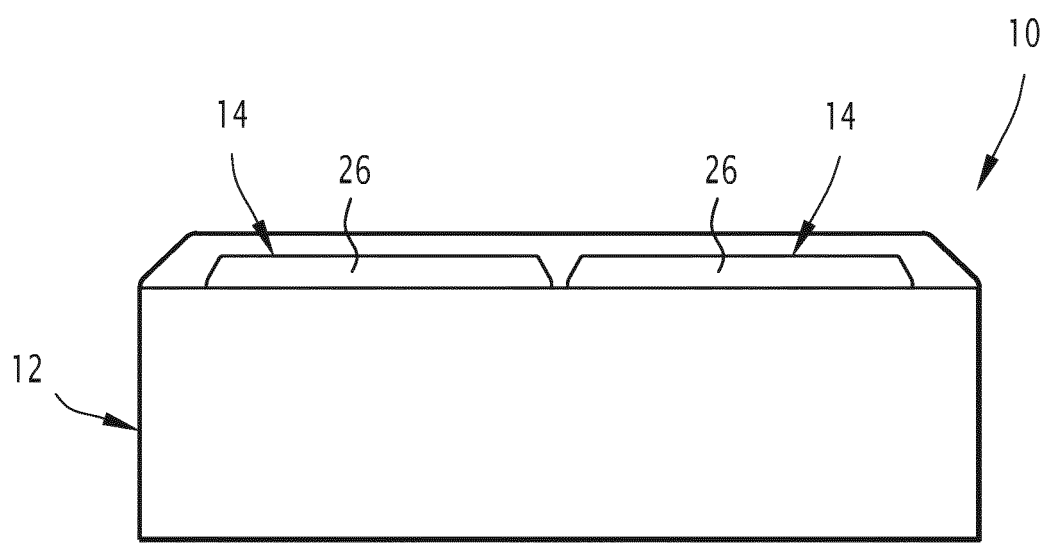
FIG. 6 is a simplified schematic representation of a trim element according to another embodiment of the invention, viewed from the front.

According to another example, the openings 26 are distributed along a same edge of the functional component 12, for example, in continuation of each other. Referring to FIG. 6, for example, two openings 26 are distributed along a top edge of the functional component 12. According to a variant, the openings 26 are distributed along a low edge of the functional component 12.

Each opening 26 may extend along an edge along the width of the functional component 12, for example, or along the height of the functional component 12, over a distance of between 150 mm and 300 mm.

The opening 26 has a width of between 12 mm and 30 mm, preferably between 13 mm and 17 mm, the width being measured along a direction substantially perpendicular to the direction of extension of the opening 26.

According to one variant, the aerator 14 comprises blades extending across the first subduct 36 and/or the second subduct 38 and/or the opening 26, for example, in a transverse direction substantially perpendicular to the direction D'. The blades make it possible to control the gas flow diffusion direction in relation to a longitudinal direction substantially perpendicular to the direction D' and to the transverse direction.

For example, one portion of the blades is mounted so as to rotate along a first axis substantially perpendicular to the direction D'.

According to this embodiment, the blades are linked to a control element (not shown) for controlling the orientation of the blades.

Preferably, the blades extend across the first subduct 36 and the second subduct 38.

The longitudinal direction extends in the elevation direction, for example, in the case where the opening 26 of the aerator 14 extends substantially along the height of the functional component 12 (as illustrated in FIG. 1). In this case, the blades are rotatable, for example, between a high position in which they direct the gas flow upwards in the passenger compartment and a low position in which they direct the gas flow downwards in the passenger compartment, according to the passenger's desire.

The longitudinal direction may also extend in a direction perpendicular to the elevation direction, for example, in the case where the opening 26 of the aerator 14 extends substantially along the width of the functional component 12, for example, along a top or bottom edge of the functional component 12. In this case, the blades are rotatable, for example, between a left position in which they direct the gas flow to the left of the passenger compartment and a right position in which they direct the gas flow to the right of the passenger compartment, according to the passenger's desire.

Alternatively, the blades can be fixed. In this case, the blades are oriented so that the blades form a non-zero angle with the main direction D in a plane comprising the longitudinal direction and the direction D. Thus, the gas flow emanating through the opening 26 is deflected from the main direction D along the longitudinal direction. For example, when the opening 26 extends substantially along the height of the functional component 12 and the direction D is inclined upward of the passenger compartment, the blades may be fixed and oriented downward in relation to the direction D. This makes it possible to direct the gas flow in such a way that it is not sent in the direction of a passenger's face, for example.

Figure 7:
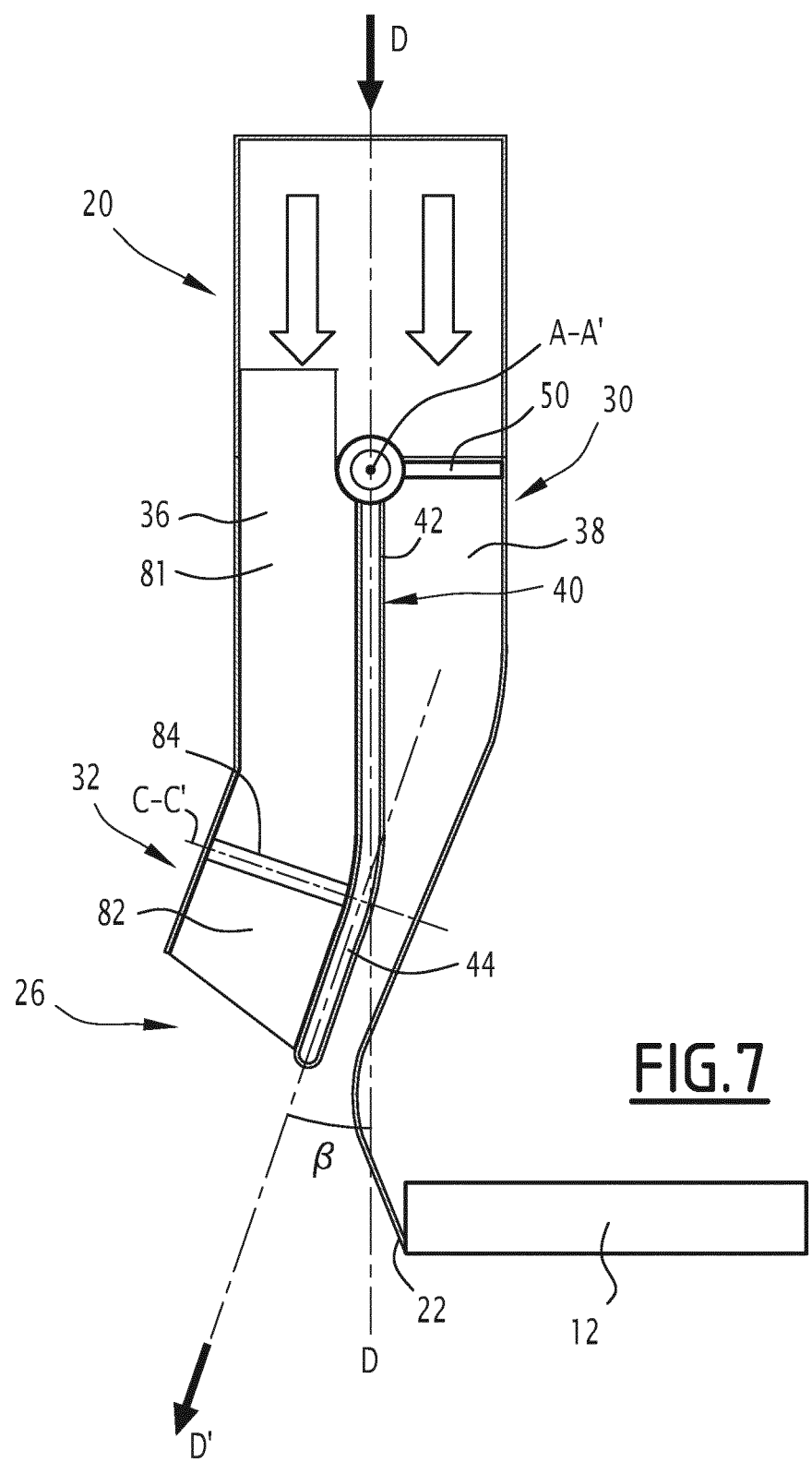
FIG. 7 is a schematic representation similar to that of FIG. 2 further showing a blade of the aerator and a functional component of the trim element.

According to the embodiment shown in FIG. 7, each blade comprises an upstream blade portion 81 and a downstream blade portion 82. Note that FIG. 7 illustrates only one blade.

According to this example, the upstream blade portion 81 extends across the first subduct 36 toward the opening 26. The upstream blade portion 81 separates the first subduct 36 in two. The upstream blade portion 81 extends in a plane forming a fixed non-zero angle with the main direction D, for example. Thus, the upstream blade portion 81 diverts the gas flow from the main direction D.

The downstream blade portion 82 extends from a downstream end of the upstream blade portion 81 across the first subduct 36 into the opening 26. It separates the first subduct 36 and the opening 26 into two.

According to the example of FIG. 7, the blade further comprises a blade joint 84. The downstream blade portion 82 is rotatably mounted on the downstream end of the upstream blade portion 81 via the blade joint 84 about a blade rotation axis C-C' substantially perpendicular to the secondary direction D'. The downstream blade portion 82 extends in a plane forming a variable angle with the plane in which the upstream blade portion 81 extends, for example. Thus, the downstream blade portion 82 is capable of changing the gas flow orientation relative to the flow direction generated by the upstream blade portion 81. The blade control component (not shown) controls the rotation of the downstream blade portion 82 about the C-C' axis relative to the upstream blade portion 81, for example.

According to one variant not illustrated, the downstream blade portion 82 is fixedly mounted on the upstream blade portion 81. The blade then has no blade joint 84, for example.

According to another variant, the downstream blade portion 82 is integral with the upstream blade portion 81 and then extends in a plane forming a fixed angle with the plane in which the upstream blade portion 81 extends.

According to still another variant, the downstream blade portion 82 is integral with the upstream blade portion 81 while being rotatable relative to the upstream blade portion 81. The blade then has a material weakening between the upstream blade portion 81 and the downstream blade portion 82, allowing rotation of the downstream blade portion 82.

Figure 8:
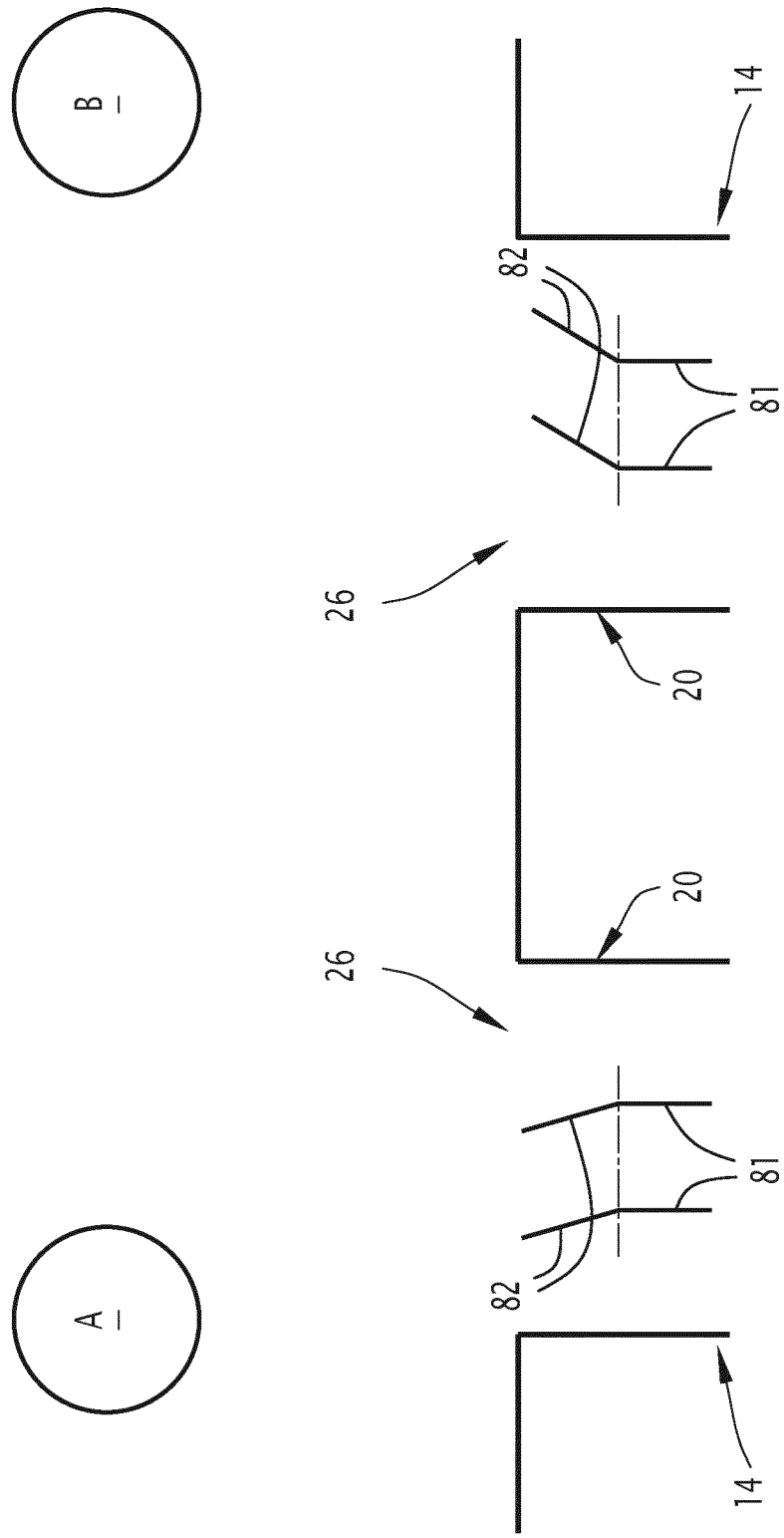
FIG. 8 is a simplified schematic representation of a vehicle interior in which a trim element according to an embodiment of the invention is arranged, viewed from above.

According to one embodiment shown in FIG. 8, the trim element 10 comprises at least two aerators 14. Only two aerators 14 are shown in FIG. 8, and the trim element 10 then has a plurality of openings 26, in particular a first opening 26A and a second opening 26B. The openings 26 are distributed along a same edge of a functional component 12, in particular along a top edge or a bottom edge of the functional component 12.

Each aerator 14 comprises blades extending through its corresponding opening 26A, 26B.

As illustrated in FIG. 8, the orientation of the downstream blade portions 82 extending through the opening 26A is different from the orientation extending through the opening 26B, for example. In other words, the angle formed by the plane in which a downstream blade portion 82 extends with the plane in which a corresponding upstream blade portion 81 extends, for example, varies from one opening 26 to another.

For each opening 26, the orientation of the downstream blade portions 82 is adaptable to ensure that the gas flow is diffused in a particular direction, for example, toward passenger A or passenger B, for example.

The downstream end of the first subduct 36, that is, the end of the first subduct 36 at the level of the opening 26, has a width of between 10 mm and 20 mm, preferably equal to 15 mm, the width being defined as the maximum distance between a point on the separation wall 40 and another point on the wall defining the first subduct 36, each point belonging to the same cross section of the first subduct 36, orthogonal to D or D'.

The downstream end of the second subduct 38, that is, the end of the second subduct 38 on the side of the opening 26, has a width of between 1 mm and 5 mm, the width being defined as the maximum distance between a point on the separation wall 40 and another point on the wall defining the second subduct 38, each point belonging to the same cross section of the second subduct 38, orthogonal to D or D'.

The curved surface 22 extends downstream from the diffusion opening 26 and extends in continuation of the second gas flow subduct 38.

The curved surface 22 has at least one point with a maximum curvature, this maximum curvature being defined by a radius of curvature R greater than 10 mm.

The distance d in the main direction D between the downstream end of the separation wall 40 of the gas flow subducts 36, 38 and the point of the curved surface with the maximum curvature is between 3 mm and 7 mm, preferably between 5 mm and 6 mm.

The separation wall 40 has a thickness of between 1 mm and 5 mm, preferably equal to 2 mm.

According to a variant not shown, the separation wall 40 has a variable thickness, in particular along its downstream portion 44. For example, the thickness of the downstream portion 44 of the separation wall 40 increases at an angle of between 0° and 15° with the direction D' towards the first subduct 36.

According to one embodiment not shown, the duct 20 comprises an additional flap. The additional flap is mounted movably between a closed position and an open position. In its closed position, the additional flap closes fluid communication between the vehicle ventilation system and the gas flow diffusion opening 26, either via the first subduct 36 or the second subduct 38. In its open position, the additional flap allows fluid communication between the vehicle ventilation system and the gas flow diffusion opening 26.

In the closed position, the additional flap extends across the entire cross-section of the duct 20 so as to prevent any passage of gas flow. In the open position, the additional flap clears the duct 20 so as to allow the passage of gas flow.

The additional flap is located upstream of the separation wall 40, for example.

In the following, the operation of the aerator 14 is described with reference to FIGS. 2 and 3.

The aerator 14 is arranged to diffuse gas flow in the vehicle passenger compartment in a gas flow diffusion direction that varies by the Coanda effect between a first diffusion direction E1 and a second diffusion direction E2, different from the first diffusion direction E1.

Figure 2:
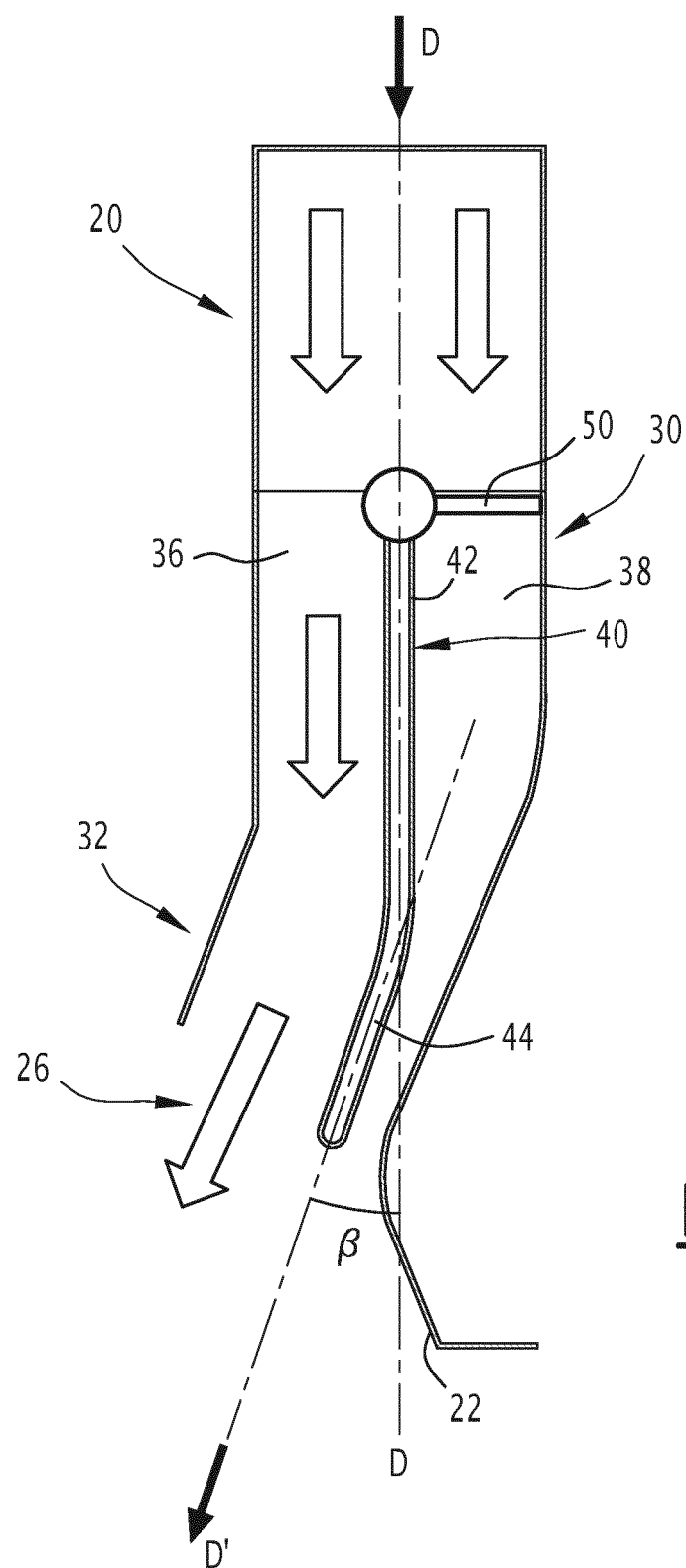
FIG. 2 is a schematic cross-sectional representation along axis II-II of FIG. 1, when the aerator diffuses a gas flow in a first diffusion direction.

With reference to FIG. 2, when the aeration flap 50 is in the closed position, the gas flow circulates in the first subduct 36 and the gas flow diffusion direction is the first diffusion direction E1, the diffusion direction E1 being substantially equal to the secondary direction D'.

Figure 3:
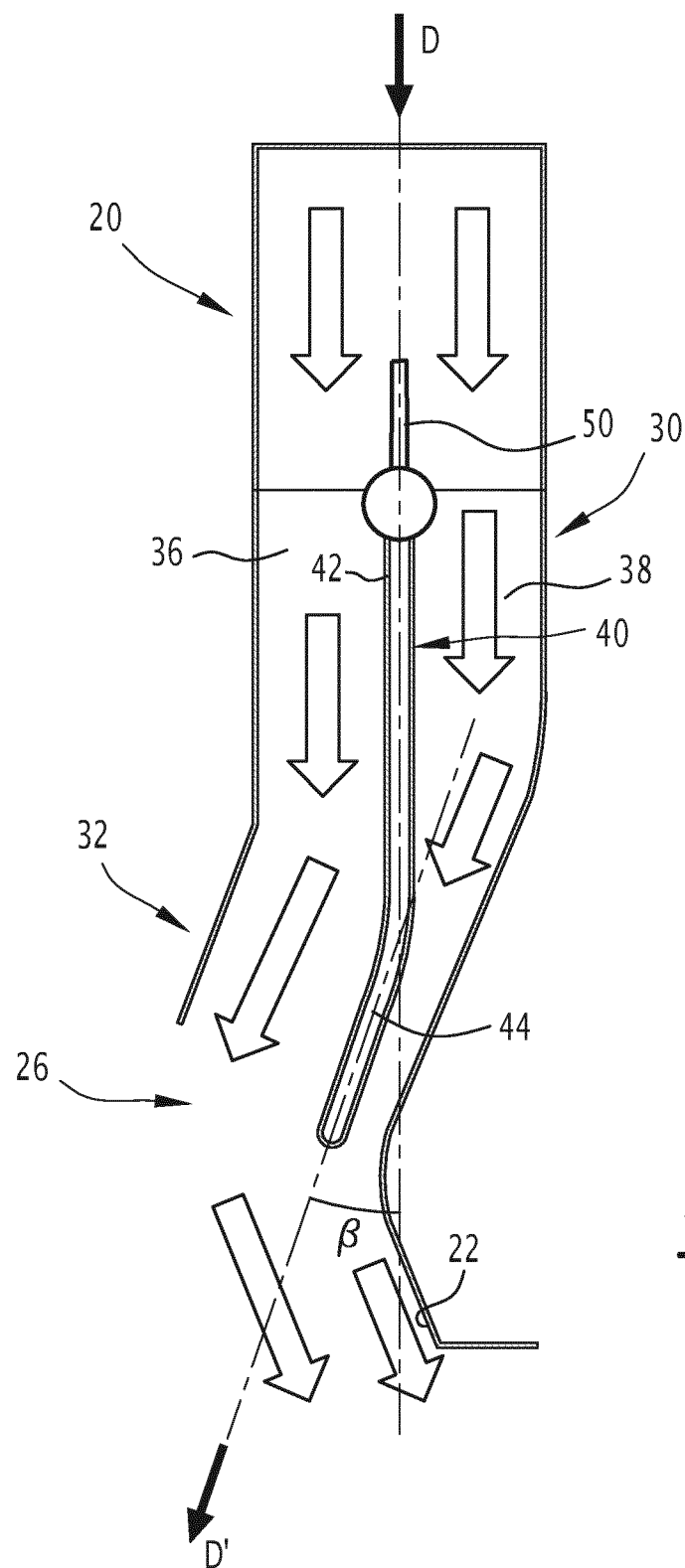
FIG. 3 is a schematic cross-sectional representation of the aerator of FIG. 2 when the aerator diffuses a gas flow in a second diffusion direction.

With reference to FIG. 3, when the aeration flap 50 is in the open position, the gas flow circulates in the two subducts 36, 38 and the gas flow diffusion direction is the second diffusion direction E2 as a result of the resulting Coanda effect.

Indeed, when the aeration flap 50 is in the open position, the gas flow circulating in the second subduct 38 is attached to the curved surface 22 on which it flows by Coanda effect. By a second Coanda effect, the gas flow circulating through the first subduct 36 is attached to the gas flow circulating along the curved surface 22.

Thus, the gas flow circulation in the second subduct 38 causes the change in the gas flow diffusion direction along the curved surface 22, from the diffusion direction E1 to the diffusion direction E2, by the Coanda effect.

Figure 4:
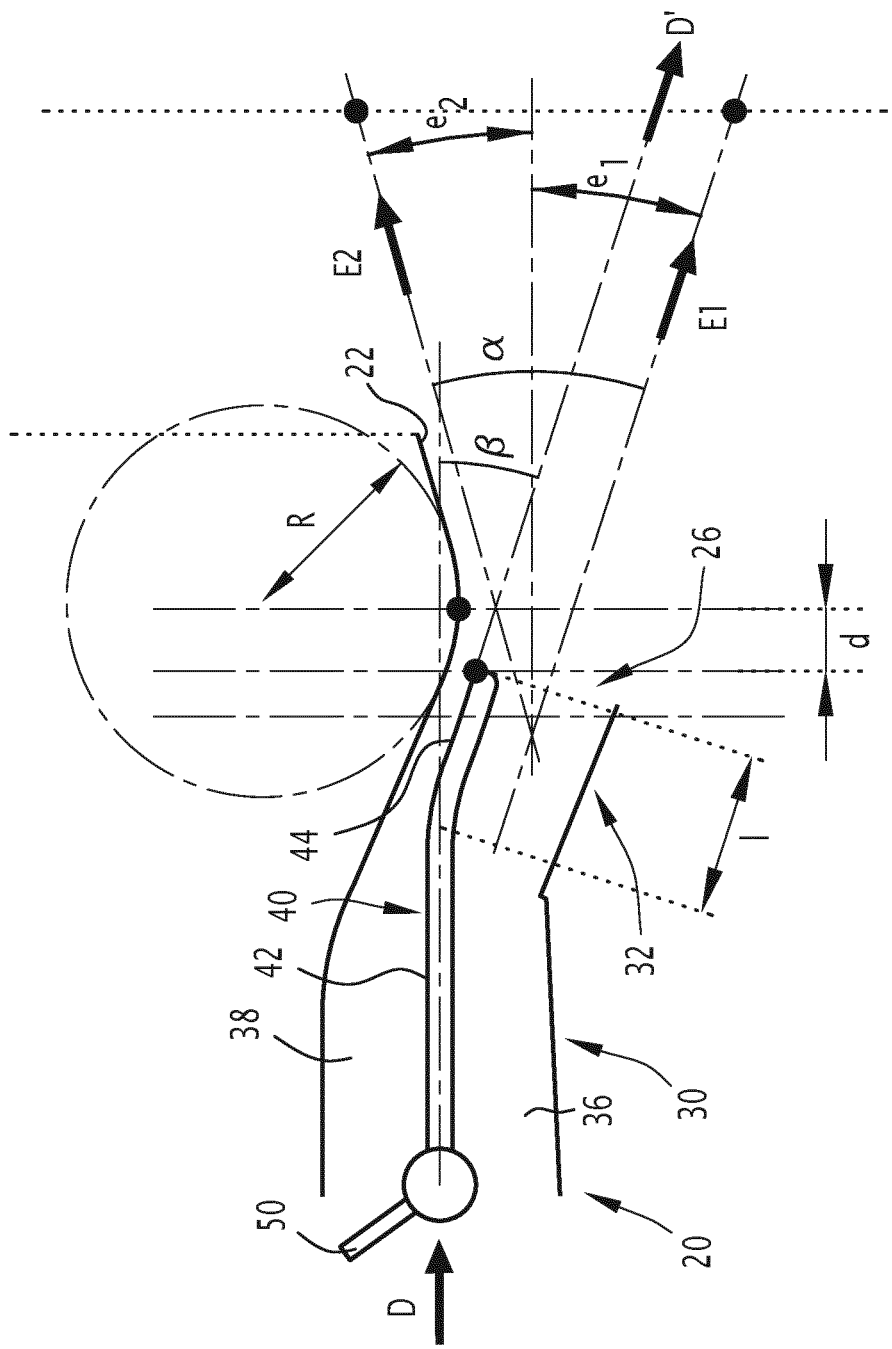
FIG. 4 is a schematic cross-sectional representation of the aerator of FIG. 2 or FIG. 3.

The direction E1 forms an angle e1 visible in FIG. 4, ranging between 10° and 25° with the direction D.

The direction E2 forms an angle e2 visible in FIG. 4, ranging between 10° and 35° with the direction D.

Thus, the angle α between E1 and E2 visible in FIG. 4, being the sum of angles e1 and e2, is between 20° and 60°.

The first and second diffusion directions E1, E2 extend towards a central part of the passenger compartment, for example, in particular towards a first seat of the vehicle or towards a second seat of the vehicle located in the central part of the passenger compartment. The aerator 14 is then adapted to diffuse a gas flow towards these seats.

The trim element 10 thus makes it possible to obtain an aerator 14 that does not encumber the trim element and leaves a maximum of space free for a functional component 12 and provides effective and adaptable ventilation of the passenger compartment by Coanda effect.

The invention claimed is:

1. A vehicle trim element comprising at least one functional component and at least one aerator for aerating a passenger compartment of a vehicle,
the at least one aerator comprising at least one gas flow conveying duct for conveying a gas flow and defining a gas flow diffusion opening, the at least one gas flow conveying duct extending in a main direction,
the at least one aerator being arranged to diffuse the gas flow in the passenger compartment of the vehicle in a gas flow diffusion direction that is variable, by Coanda effect, between a first diffusion direction and a second diffusion direction, different from the first diffusion direction,
wherein the gas flow diffusion opening extends around a periphery of at least a portion of the at least one functional component,
wherein the at least one gas flow conveying duct comprises at least one first gas flow conveying subduct and at least one second gas flow conveying subduct in fluid communication with the gas flow diffusion opening, the at least one first gas flow conveying subduct and the at least one second gas flow conveying subduct being separated by a separation wall, the at least one second gas flow conveying subduct comprising an aeration flap, the aeration flap being movable between a closed position, in which the aeration flap closes fluid communication between a vehicle ventilation system and the gas flow diffusion opening via the at least one second gas flow conveying subduct and in which the gas flow diffusion direction is the first diffusion direction, and an open position, in which the aeration flap allows fluid communication between the vehicle ventilation system and the gas flow diffusion opening via the at least one second gas flow conveying subduct and in which the gas flow diffusion direction is the second diffusion direction, and
wherein the at least one aerator comprises at least one curved surface extending from the gas flow diffusion opening in line with the at least one second gas flow conveying subduct and extending beyond the gas flow diffusion opening in the main direction.

2. The trim element according to claim 1, wherein an angle between the first diffusion direction and the second diffusion direction is between 20° and 60°.

3. The trim element according to claim 1, wherein a point of maximum curvature of the at least one curved surface has a radius of curvature greater than 10 mm.

4. The trim element according to claim 1, wherein a distance in the main direction between a downstream end of the separation wall and a point of maximum curvature of the at least one curved surface is between 3 mm and 7 mm.

5. The trim element according to claim 4, wherein the distance in the main direction is between 5 mm and 6 mm.

6. The trim element according to claim 1, wherein the at least one second gas flow conveying subduct has a decreasing width along the main direction.

7. The trim element according to claim 1, wherein the aeration flap is mounted rotatably about a flap rotation axis for movement between the closed position and the open position, the trim element comprising a control element for controlling rotation of the aeration flap, the control element having a control part rotatably mounted about a control rotation axis and a universal joint configured to drive the aeration flap rotationally about the flap rotation axis when the control part is rotated about the control rotation axis.

8. The trim element according to claim 1, wherein the at least one aerator comprises blades, each blade comprising an upstream blade portion and a downstream blade portion, the upstream blade portion extending across the at least one first gas flow conveying subduct toward the gas flow diffusion opening, the downstream blade portion extending from a downstream end of the upstream blade portion across the at least one first gas flow conveying subduct into the gas flow diffusion opening, the downstream blade portion being adapted to change a gas flow orientation relative to a flow direction generated by the upstream blade portion.

9. The trim element according to claim 1, in which the at least one gas flow conveying duct comprises an upstream portion extending in the main direction and a downstream portion extending in a secondary direction forming a non-zero angle with the main direction, the downstream portion extending downstream of the upstream portion in the gas flow diffusion direction in the at least one gas flow conveying duct.

10. The trim element according to claim 9,
wherein the separation wall comprises an upstream portion extending in the main direction and a downstream portion extending in the secondary direction.

11. The trim element according to claim 9, wherein the non-zero angle formed by the main direction and the secondary direction is substantially between 15° and 25°.

12. The trim element according to claim 9, wherein the at least one aerator comprises blades, each blade comprising an upstream blade portion and a downstream blade portion, the upstream blade portion extending across the at least one first gas flow conveying subduct toward the gas flow diffusion opening, the downstream blade portion extending from a downstream end of the upstream blade portion across the at least one first gas flow conveying subduct into the gas flow diffusion opening, the downstream blade portion being adapted to change a gas flow orientation relative to a flow direction generated by the upstream blade portion, and wherein each blade comprises a blade joint, the downstream blade portion being mounted rotatably on the downstream end of the upstream blade portion via the blade joint for rotation about a blade rotation axis substantially perpendicular to the secondary direction.

13. The trim element according to claim 1, comprising at least two aerators, each aerator comprising at least one gas flow conveying duct defining a gas flow diffusion opening, the gas flow diffusion openings being distributed along a same edge of the at least one functional component.

14. A vehicle trim element comprising at least one functional component and at least one aerator for aerating a passenger compartment of a vehicle,
- the at least one aerator comprising at least one gas flow conveying duct for conveying a gas flow and defining a gas flow diffusion opening, the at least one gas flow conveying duct extending in a main direction,
- the at least one aerator being arranged to diffuse the gas flow in the passenger compartment of the vehicle in a gas flow diffusion direction that is variable, by Coanda effect, between a first diffusion direction and a second diffusion direction, different from the first diffusion direction,
- wherein the gas flow diffusion opening extends around a periphery of at least a portion of the at least one functional component,
- wherein the at least one gas flow conveying duct comprises at least one first gas flow conveying subduct and at least one second gas flow conveying subduct in fluid communication with the gas flow diffusion opening, the at least one first gas flow conveying subduct and the at least one second gas flow conveying subduct being separated by a separation wall, the at least one second gas flow conveying subduct comprising an aeration flap, the aeration flap being movable between a closed position, in which the aeration flap closes fluid communication between a vehicle ventilation system and the gas flow diffusion opening via the at least second gas flow conveying subduct and in which the gas flow diffusion direction is the first diffusion direction, and an open position, in which the aeration flap allows fluid communication between the vehicle ventilation system and the gas flow diffusion opening via the at least second gas flow conveying subduct and in which the gas flow diffusion direction is the second diffusion direction, and
- wherein the at least one aerator comprises blades, each blade comprising an upstream blade portion and a downstream blade portion, the upstream blade portion extending across the at least one first gas flow conveying subduct toward the gas flow diffusion opening, the downstream blade portion extending from a downstream end of the upstream blade portion across the at least one first gas flow conveying subduct into the gas flow diffusion opening, the downstream blade portion being adapted to change a gas flow orientation relative to a flow direction generated by the upstream blade portion.

15. A vehicle trim element comprising at least one functional component and at least one aerator for aerating a passenger compartment of a vehicle,
- the at least one aerator comprising at least one gas flow conveying duct for conveying a gas flow and defining a gas flow diffusion opening, the at least one gas flow conveying duct extending in a main direction,
- the at least one aerator being arranged to diffuse the gas flow in the passenger compartment of the vehicle in a gas flow diffusion direction that is variable, by Coanda effect, between a first diffusion direction and a second diffusion direction, different from the first diffusion direction,
- wherein the gas flow diffusion opening extends around a periphery of at least a portion of the at least one functional component,
- wherein the at least one gas flow conveying duct comprises an upstream portion extending in the main direction and a downstream portion extending in a secondary direction forming a non-zero angle with the main direction, the downstream portion extending downstream of the upstream portion in the gas flow diffusion direction in the at least one gas flow conveying duct,
- wherein the at least one gas flow conveying duct comprises at least one first gas flow conveying subduct and at least one second gas flow conveying subduct in fluid communication with the gas flow diffusion opening, the at least one first gas flow conveying subduct and the at least one second gas flow conveying subduct being separated by a separation wall, the at least one second gas flow conveying subduct comprising an aeration flap, the aeration flap being movable between a closed position, in which the aeration flap closes fluid communication between a vehicle ventilation system and the gas flow diffusion opening via the at least second gas flow conveying subduct and in which the gas flow diffusion direction is the first diffusion direction, and an open position, in which the aeration flap allows fluid communication between the vehicle ventilation system and the gas flow diffusion opening via the at least second gas flow conveying subduct and in which the gas flow diffusion direction is the second diffusion direction, and
- wherein the separation wall comprises an upstream portion extending in the main direction and a downstream portion extending in the secondary direction.

* * * * *